INVENTOR
JEAN-PAUL ZWILLING
By
OSTROLENK, FABER, GERB & SOFFEN
ATTORNEYS

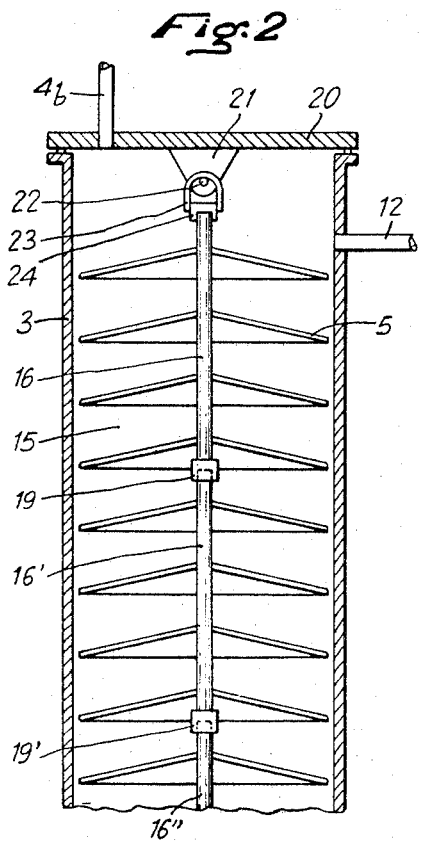
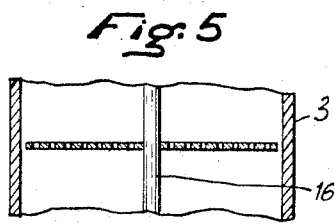
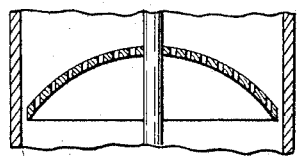
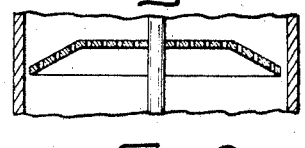
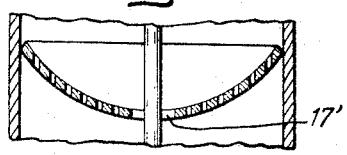
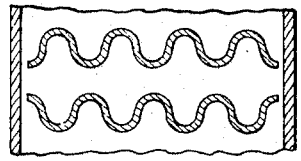
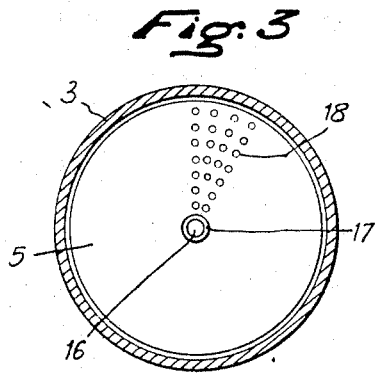
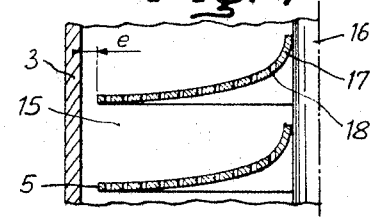

United States Patent Office 3,428,419
Patented Feb. 18, 1969

3,428,419
METHOD FOR PRODUCING AMMONIUM SULFATE
Jean-Paul Zwilling, Pau, France, assignor to Societe Nationale des Petroles d'Aquitaine, Paris, France, a corporation of France
Original application Feb. 19, 1962, Ser. No. 173,928. Divided and this application June 28, 1965, Ser. No. 467,699
Claims priority, application France, Feb. 21, 1961, 853,348
U.S. Cl. 23—119    3 Claims
Int. Cl. C01c 1/24

ABSTRACT OF THE DISCLOSURE

Method for the production of ammonium sulfate from ammonium sulfite and ammonium bisulfite involving feeding the aqueous reaction mixture of the latter materials through a number of individual regions in an elongated reaction zone while maintaining laminar flow and minimizing turbulence throughout such zone.

---

This is a divisional application of application Ser. No. 173,928, filed Feb. 19, 1962, and now abandoned.

The present invention relates to a new process for the manufacture of ammonium sulfate by heating aqueous solutions of ammonium sulfite and ammonium bisulfite.

In the following specification, all parts and percentages are given by weight, unless otherwise indicated.

The conversion of aqueous mixtures of ammonium sulfite and bisulfite to ammonium sulfite, by heating under pressure, is a well-known operation. The operation is generally carried out in an autoclave, at temperatures of the order of 150° C. Since continuous operation is industrially the most advantageous method, vertically disposed cylindrical reactors are most often used, mounted with tubular heat exchangers for maintaining the solution at the appropriate temperature and pressure, and with means for continuously circulating the mixture therethrough.

Previously known procedures for the manufacture of ammonium sulfate are, however, subject to a number of industrially significant disadvantages. The rates of conversion rarely exceed 95%; resulting in the troublesome presence of sulfite in the liquors obtained. Furthermore, unchanged sulfur dioxide present causes corrosion in the subsequent portion of the apparatus employed. Furthermore, in the heretofore known processes particles of sulfur are carried along in the product liquors.

It is among the objects of the present invention to remedy the above disadvantages of known methods for the manufacture of ammonium sulfate from aqueous mixtures of ammonium sulfite and ammonium bisulfite. In accordance with the invention, practically quantitative rates of conversion, based on the sulfur dioxide reacted, are effected; consequently, the corrosion is suppressed, substantially all the sulfur dioxide present being converted to sulfate. The invention also suppresses the disadvantages inherent in the formation of liquid sulfur within the treated solutions. These and other objects and advantages of the process of the present invention will be more fully apparent from the following detailed description of preferred embodiments thereof.

Ammonium sulfate is produced by the reaction of an aqueous mixture of ammonium sulfite and ammonium bisulfite, in accordance with the present invention, by feeding such a mixture through a plurality of transverse regions in an elongated reaction zone while maintaining laminar flow between each such region and minimizing turbulence throughout the reaction zone. The laminar flow is maintained and turbulence minimized, in accordance with the process hereof, by uniformly introducing the reaction mixture into each successive reaction region across an interface substantially coincident with, and occupying from 10% to 30% of, the cross-sectional area of the reaction zone; and concurrently feeding sulfur separated from the reaction mixture through a restricted annular region extending lengthwise of the reaction zone and abutting the successive transverse regions thereof; and finally separating the sulfur from the reaction mixture.

The sulfite and bisulfite-containing mixture is thus fed through a reaction zone without any generalized agitation therein. In particular, there is thus produced, in accordance with the method of the present invention, a reaction system involving a series of regions through which the flow of the reaction liquid takes place, substantially without axial diffusion. It has been found that prior reaction systems, employing relatively large diameter reactors, are inherently subject to just such generalized agitation and consequent axial diffusion.

According to a preferred feature of the invention, the aqueous solution containing the ammonium sulfite and bisulfite which is to be converted into sulfate with separation of sulfur, is first rapidly heated to the temperature at which the reaction is initiated—say, between 120° and 190° C.—and is then passed across an unheated reaction zone; in this zone the flow of the solution is fractionated into a certain number of regions without axial diffusion between the successive regions; the residence period in such zone is sufficiently long to allow the reaction to be completed.

An apparatus which is particularly suitable for carrying out the novel process comprises, so far as concerns the reaction zone, a tight vessel having at least one inlet and one outlet, respectively, at its two opposite ends, the interior of the vessel being divided into a plurality of communicating compartments by separating elements placed transversely with respect to the length of the vessel, to prevent backflow of the solution.

The separating elements can be constituted by perforated plates and/or grids, placed perpendicularly to the axis of the vessel and to the direction of the passage of solution.

The axis of the reactor thus employed according to the invention can be horizontal, oblique or vertical; in other words, the straight or curved line connecting its inlet or inlets and its outlet or outlets can be horizontal, inclined or vertical. In general, the most simple arrangement is vertical; in this case the apparatus can be used with an upward or downward circulation of liquid.

One preferred embodiment of reactor which may be employed in the practice of the invention consists in a vertical cylinder provided with an inlet or outlet at its bottom and a corresponding outlet or inlet at its top, and a plurality of perforated conical separating elements placed in the cylinder coaxially therewith.

The conical elements or funnels preferably are arranged with their concave sides downwards, and their outer edges adjacent the inside wall of the cylinder. The separation between the elements and the wall of the reactor thus provided constitutes a path of flow for the sulfur formed in the course of the reaction. When the elements are arranged with their concave side upwards, a sufficient passage is provided in their central region to allow sulfur to flow along the axis of the apparatus. In this case it is preferable to have the periphery of each element in contact with the inside wall of the reactor.

The numbers and diameter of the perforations in the separating elements can be varied, especially according to the rate of flow of solution, which it is desired to pass through the apparatus.

The funnels, perforated plates, or other separating elements, arranged according to the invention transversely to the longitudinal axis of the reaction vessel, separate the internal space of the vessel into a series of zones which function as reaction regions communicating with each other via the perforations in the separating elements. Any eddies or agitations of the liquid, which may be produced in each of the unitary regions are limited to the zones formed between two successive elements; consequently large eddies, which might carry a certain fraction of the liquid directly from the inlet region to the outlet region of the apparatus, cannot be formed within the whole of the liquid body reacting. Hence, by use of the perforated separating elements, the totality of liquid progresses uniformly through the reaction zone and remains therein for the required period of time.

In general, the objects of the invention are achieved when the total surface of the perforations of the several elements, i.e., the interface across which the reaction medium may pass from region to region, is between 0.5% and 50% of the cross-sectional area of the reactor, and, preferably, between 10 and 30% thereof. Thus, for example, good results are obtained employing separating elements having uniform perforations of 10 mm. diameter, totaling a tenth of the cross-sectional area of the reactor.

According to the rate of flow desired, the distance between two successive elements can be varied, widely, the most frequently used separation being between 10 and 50 cm. Thus, for example, in an apparatus of 400 mm. internal diameter, working with a rate of flow of 4 m.$^3$ of solution per hour, perforated reversed funnel-shaped elements placed 200 to 400 mm. apart have been used with success.

The funnel-shaped conical elements, used to produce laminar flow, become more suitable as their summit angle approaches a certain optimum value. It is particularly favorable to use conical elements, the summit angle of which is between 120° and 180°, and especially between 130° and 160°.

Preferred forms of apparatus suitable for carrying out the process of the invention are schematically illustrated in the accompanying drawings, in which:

FIG. 2 is a partial longitudinal section through the reaction vessel of the system illustrated in FIG. 1;

FIG. 3 is a vertical section through the reactor of FIG. 2;

FIG. 4 is a partial longitudinal section through the reactor, showing a portion of the separator element assembly hereof in greater detail; and FIGS. 5–9, inclusive, show, in longitudinal section, some modifications of separating elements for the inside of the reactor.

Figure 1:
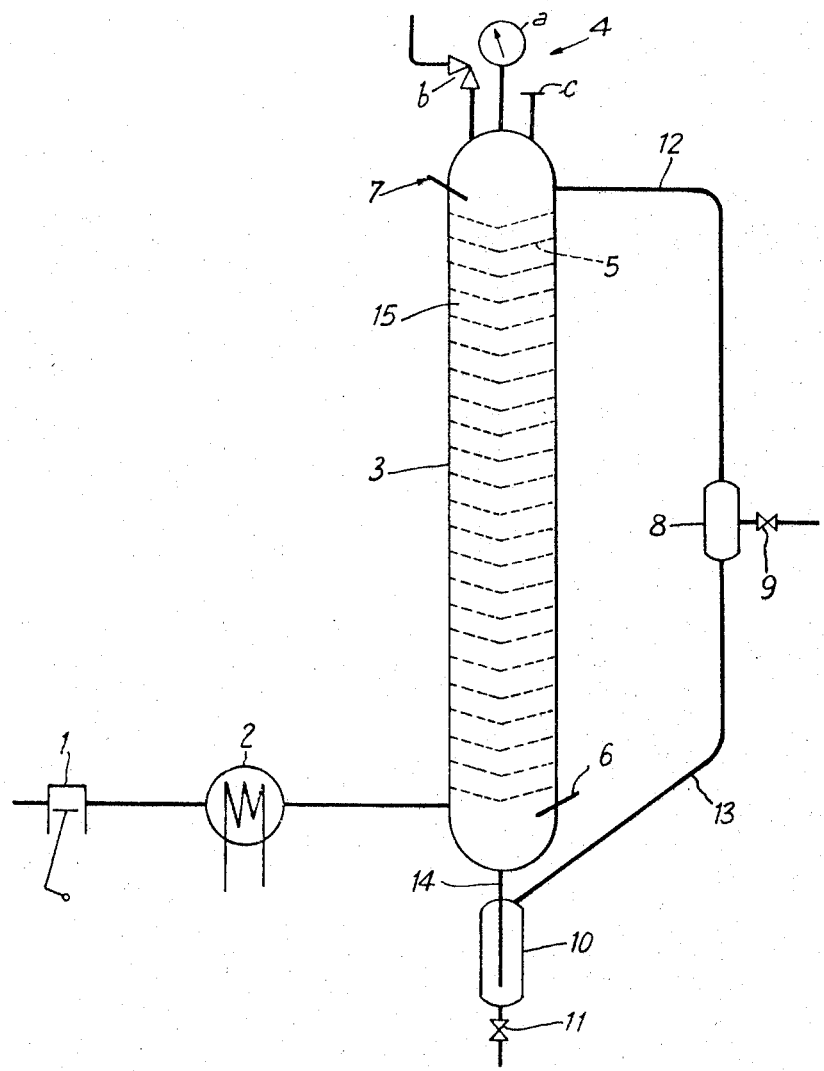
FIG. 1 is a general diagrammatical view of a reaction system employed according to the invention.

Referring to FIG. 1, a pump 1 serves to feed the solution to be treated through a heat exchanger 2 where it is preheated before the solution enters the bottom part of a reactor 3.

The reactor 3 is surrounded by insulation (not shown), and is divided internally into a large number of compartments 15 by the perforated conical separating elements 5, represented by broken lines.

At the upper end of the reactor there is the usual collection of safety devices, represented collectively by the reference numeral 4. These comprise a monometer $a$, an excess pressure valve $b$ and a rupture disc $c$. Thermometers 6 and 7 are placed, respectively, at the base and top of the reactor.

The exit pipe 12, leading from the upper part of the reactor 3, terminates at a tank 8 for decantation of sulfur. From this tank a lateral pipe carries away the solution to be treated and is provided with an expansion valve 9. The base of the decantation tank 8 is connected by a pipe 13 to a reservoir 10 for sulfur which also communicates with the bottom of the reactor 3 via a pipe 14. A valve 11 allows the precipitated sulfur, contained in the reservoir 10, to be removed.

FIG. 2 is an axial section of the upper part of the reactor 3, constructed according to one particular embodiment of the invention. In this form, the perforated cones 5 are arranged with their concave side downwards; they are fixed concentrically on a tubular central or axial support made up of sections 16, 16', and 16''.

On FIGS. 3 and 4 is shown in greater detail the position of the cones 5 inside the reactor. The perforations 18 of the cones 5 are shown in FIG. 3 in only one sector, but it is of course to be understood that in fact they are present over the whole of the surface of the cones.

FIG. 4 shows half of an axial section through two adjacent cones; the central cuspoidal neck 17 is fixed to the support 16, while the periphery of the cone 5 does not touch the interior wall of the reactor 3 at any point, so as to leave a space $e$ for the passage of sulfur.

FIGS. 5 to 9 show by way of example some embodiments of separating elements other than the cones 5. Thus in FIG. 5 is seen a perforated plane plate. The element of FIG. 6 has the appearance of a clock-glass, that of FIG. 7 a truncated cone. The element of FIG. 8 is shaped like a clock-glass placed with its concave side upwards; in this case it is preferable to allow a free passage, at 17', between the neck of the element and the axis 16 for the flow of sulfur; on the other hand, in this case, the periphery of the element can touch the interior wall of the reactor 3. The separating elements can, if desired, be constituted by corrugated sheets such as those shown in FIG. 9, which increase their resistance.

In order to facilitate the introduction into and also removal from the reactor of the separating elements, one particular form of construction of the invention provides a system of assembly of these elements in groups. FIG. 2 depicts a case where the cones 5 are fixed in groups of four, on the axial rods 16, 16', 16'', etc.

Each of these rods 16, 16', 16'', etc., terminates above in a male threaded portion and terminates below in an enlarged part, 19, 19', etc., which is threaded internally to the same diameter and pitch as the male extremity.

FIG. 2 shows three groups of cones thus assembled by screwing the male extremity into the lower extremity of the other (in the third group, on the axis 16'', only the uppermost cone is shown).

This system allows the separating elements to be easily installed and removed even from a reactor of great height, without having to use a framework and a machine to lift the assembly to the corresponding height from the bottom of the reactor. It suffices to work at the height of a group of four elements and to screw up or unscrew the axis of this group, as soon as its corresponding coupling 19, 19', 19'' emerges from the reactor 3.

The cover 20 of the reactor carries on its lower face a bracket 21 bearing a pin 22. From this pin is suspended a supporting link 23, the lower part of which is attached to an internally threaded sleeve 24. The diameter and pitch of the thread of this sleeve 24 are the same as those of the couplings 19, 19', 19'', etc.; the upper extremity of the supporting axis 16 is thus screwed into the sleeve 24 and in this manner the assembly of cones 5 in the reactor is suspended from the cover 20. It suffices to lift up this cover for withdrawing as many of the groups of cones as is desired.

The invention is applicable to apparatus of very different dimensions, corresponding to different hourly production rates. By way of nonlimiting example, excellent conversions of sulfite into sulfate may be obtained employing a reactor of 300 to 500 mm. internal diameter, of a height of 7 to 14 m., in which the perforated separating elements are spaced from one another by 200 to 500 mm. Perforations of, for example, 6 to 16 mm. in diameter can be used, of which the total surface per element represents 10 to 30% of the cross-sectional area of the reactor.

To illustrate the process of the invention, the following nonlimiting example is provided:

EXAMPLE

An installation was used corresponding to that shown in FIGS. 1 and 2. The reactor had an internal diameter of 400 mm. and a height of 11 m. The funnel-shaped separating elements 5 were of 390 mm. external diameter, leaving a space of 5 mm. adjacent the inner wall of the reactor for the passage of sulfur. The summit angle of the funnels was 145°, and they were spaced apart 250 mm. The perforations were 10 mm. in diameter, and represented 20% of the total surface of the funnels.

The safety valve 4b and the rupture disc 4c were set at a pressure of 16 hectopieze, the reactor operating under about 12 hectopieze. A "hectopieze" is a standard European unit for pressure (1 hectopieze equals 0.9867 atmosphere).

The reactor was fed via the pipe 1 with four cubic meters per hour of a solution of the following composition, expressed in g.-mol./liter:

Ammonium thiosulfate _____ 0.89
Ammonium sulfite and bisulfite _____ 2.92
Ammonium sulfate _____ 0.33
Total ammonia _____ 5.91

The pH of this solution was 4.2.

The temperature at 6 (FIG. 1), at the base of the reactor, was maintained at 155° C.; that at 7 near the outlet from the apparatus was 186° C.

Liquid sulfur was removed through pipe 11 at the rate of about 120 liters per hour, the treated solution was removed via the pipe 9 to another plant where neutralization and crystallization of the ammonium sulfate took place.

The product solution contained in g.-mol./liter:

Ammonium bisulfate _____ 0.01
Ammonium sulfite and bisulfite _____ 0.00
Ammonium sulfate _____ 3.60
$H_2SO_4$ _____ 0.60 and had a pH of 1.3.

The rate of transformation of thiosulfate, sulfite and bisulfite amounted to 99.7%.

The process of the present invention thus facilitates the efficient manufacture of ammonium sulfate from ammonium sulfite and bisulfite in conversions which have heretofore rarely been commercially obtainable.

It will be understood that various changes may be made in the preceding preferred embodiments of the process hereof without departing from the scope of the invention. Accordingly, it is intended that the preceding description and the accompanying drawings should be construed as illustrative and not in a limiting sense.

I claim:
1. A method for the production of ammonium sulfate by the reaction of an aqueous mixture of ammonium sulfite and ammonium bisulfite, which comprises feeding said mixture at a temperature of at least 120° C. through a plurality of transverse regions in an elongated reaction zone while maintaining laminar flow between each said region and minimizing turbulence throughout the reaction zone by:
    (a) uniformly introducing the mixture into each successive region across an interface substantially coincident with, and occupying from 10% to 30% of, the cross-sectional area of said reaction zone,
    (b) feeding sulfur separated from the reaction mixture through a restricted annular region extending longitudinally of said reaction zone and abutting the successive transverse regions thereof, and
    (c) separating the sulfur from said mixture.
2. The method as defined in claim 1, in which the reaction mixture is maintained at temperatures within the range of from 120 to 190° C., while it is fed through the plurality of transverse reaction regions in said reaction zone.
3. A method for the production of ammonium sulfate by the reaction of an aqueous mixture of ammonium sulfite and ammonium bisulfite, which comprises:
    (a) rapidly heating said aqueous mixture to temperatures within the range of from 120 to 190° C.,
    (b) feeding said mixture into an unheated, elongated reaction zone for reaction thereof,
    (c) uniformly introducing the mixture into a plurality of successive transverse regions in said reaction zone across interfaces substantially coincident with, and occupying from 10% to 30% of, the cross-sectional area of said zone,
    (d) feeding sulfur separated from the reaction mixture through a restricted annular region extending longitudinally of said reaction zone and abutting the successive transverse regions thereof, and
    (e) separating the sulfur from said reaction zone.

References Cited

UNITED STATES PATENTS 1,133,086    3/1915    Bosch _____ 23—119
1,769,938    7/1930    Benner et al. _____ 23—119

OSCAR R. VERTIZ, *Primary Examiner.*

EARL C. THOMAS, *Assistant Examiner.*

U.S. Cl. X.R.

23—224, 283